United States Patent [19]

Sakazume et al.

[11] Patent Number: 5,166,240
[45] Date of Patent: Nov. 24, 1992

[54] THERMOPLASTIC RESIN COMPOSITIONS AND THEIR USE

[75] Inventors: Suehiro Sakazume, Fujisawa; Yuichi Orikasa, Yokohama, both of Japan

[73] Assignee: Nippon Petrochemicals Co., Ltd., Japan

[21] Appl. No.: 631,389

[22] Filed: Dec. 20, 1990

[30] Foreign Application Priority Data

Dec. 27, 1989 [JP] Japan .................................. 1-342105

[51] Int. Cl.$^5$ ...................... C08L 51/06; C08L 23/10; C08L 23/16; C08K 3/00
[52] U.S. Cl. .................................... 524/451; 524/504; 525/70; 525/75; 525/79; 525/80; 293/102
[58] Field of Search ............................. 525/70, 79, 80; 524/451

[56] References Cited

U.S. PATENT DOCUMENTS

| | | | |
|---|---|---|---|
| 4,665,131 | 5/1987 | Moriya et al. | 525/277 |
| 4,839,423 | 6/1989 | Moriya et al. | 525/217 |
| 4,879,347 | 11/1989 | Moriya et al. | 525/277 |
| 4,889,888 | 12/1989 | Bassi et al. | 525/70 |
| 4,910,254 | 3/1990 | Johnston | 525/70 |
| 4,923,956 | 5/1990 | Moriya et al. | 525/277 |
| 4,957,974 | 9/1990 | Illenda et al. | 525/70 |

OTHER PUBLICATIONS

Exxon–"Exxon Elastomers For Polyolefin Modification" 1975 pp. 1, 3, 4 & 31–33.

*Primary Examiner*—Carman J. Seccuro, Jr.
*Attorney, Agent, or Firm*—Ostrolenk, Faber, Gerb & Soffen

[57] ABSTRACT

There is provided a thermoplastic resin composition and a molded bumper therefrom in which said composition comprises:

(I) 1 to 99 parts by weight of a propylene polymer, and
(II) 99 to 1 parts by weight of a multi-phase structure thermoplastic resin which is a graft copolymer comprising 5 to 95% by weight of a propylene polymer and 95 to 5% by weigth of a vinyl polymer obtained from at least one vinyl monomer, either of the components being formed with a dispersion phase having a particle diameter of 0.001 to 10 μm.

8 Claims, No Drawings

THERMOPLASTIC RESIN COMPOSITIONS AND THEIR USE

BACKGROUND OF THE INVENTION (1) Field of the invention

The present invention relates to thermoplastic resin compositions and their use, and more particularly to thermoplastic resin compositions and molded articles therefrom such as car bumpers having excellent impact resistance, coating and adhering properties.

(2) Description of the Prior Art

Propylene polymers are reasonable in price and have excellent mechanical properties, moldability, chemical resistance and the like. They are widely used in many plastic molding fields. However, in the propylene polymers impact resistance, coating and adhering properties of molded articles therefrom are relatively poor, and for this reason, the range of use of such propylene polymers had certain limitations. Japanese Patent Unexamined Publication Nos. 63-39951 and 63-122752 describe a thermoplastic composition for use in car bumpers wherein a thermoplastic elastomer is blended with a propylene polymer to improve impact resistance and coating properties of molded bumpers therefrom. In coating molded propylene polymer articles, there has been widely used a method comprising cleaning the surface of said articles by the use of a halogen-contained organic solvent such as 1,1,1-trichloroethane, trichloroethylene and the like, followed by primer coating and final coating.

A method wherein a vinyl polymer is blended with a propylene polymer to improve the above-mentioned poor properties of propylene polymer has been also known. Japanese Patent Unexamined Publication No. 58-93730 discloses a improved method for dispersing a polystyrene into a propylene polymer wherein the propylene polymer is blended with a polystyrene-modified propylene polymer prepared by the use of a specific process.

As to the above-mentioned method including a cleaning step, the need exists for a new process which do not employ the halogen-containing solvent as a cleaning agent in the aspects on environmental pollution.

However, it has been known that when a noncleaning process is employed, the adhering properties of molded articles to a primer become extremely poor.

In the reference Japanese Patent Unexamined Publication No. 58-93730, only a small amount of the polystyrene can be blended with the propylene polymer because of their poor compatibilities, and the test results for molded articles from the blended composition show a tendency to become poor in impact resistance. As to the polystyrene-modified propylene polymer, it has been found that the compatibility of said resin with a propylene polymer is still insufficient because the grafting efficiency of said modified resin is relatively low.

SUMMARY OF THE INVENTION

In accordance with the present invention, it has unexpectedly been found that when a specific multi-phase structure thermoplastic resin is blended, a thermoplastic resin composition can be obtained in which impact resistance, coating and adhering properties of molded articles are excellent, with features of the propylene polymer having good mechanical properties kept up.

In this case, said excellent adhering properties of molded articles such as car bumpers to a primer can be achieved without treating the surface of the molded articles with a halogen-contained cleaning solvent.

The aspect of the present invention is directed to a thermoplastic resin composition and a molded car bumper therefrom in which said composition comprising:

(I) 1 to 99 parts by weight of a propylene polymer, and (II) 99 to 1 parts by weight of a multi-phase structure thermoplastic resin which is a graft copolymer comprising 5 to 95% by weight of a propylene polymer and 95 to 5% by weight of a vinyl polymer obtained from at least one vinyl monomer, either of the components being formed with a dispersion phase having a particle diameter of 0.001 to 10 μm, said graft copolymer being obtained by melting and kneading a graft polymerization precursor (A) which is prepared by copolymerizing at least one vinyl monomer with at least one of radical polymerizable organic peroxides having the general formulae (a) or (b):

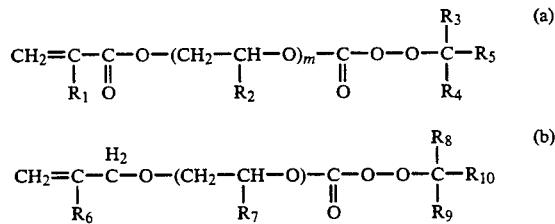

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of a propylene polymer.

DETAILED DESCRIPTION OF THE INVENTION

The propylene polymer (I) used in the present invention is similar to the crystalline propylene polymer used in the preparation of the multi-phase thermoplastic resin. Said preparation will be described afterward. Examples of the propylene polymer include homopolymers of propylene or copolymers of propylene with other α-olefins, or copolymers of propylene with polar ethylenically unsaturated monomers, with the preferred copolymers being those containing over 75% by weight of propylene.

Typical examples of the propylene polymer used in the present invention include isotactic polypropylenes, crystalline propylene-ethylene random copolymers, crystalline propylene-ethylene block copolymers, crystalline propylene-1-buten random copolymers, maleic anhydride modified polypropylenes, and mixtures thereof.

Other polymers may be mixed therewith provided that features of the propylene polymer are not impaired.

Typical examples of the vinyl polymer in the multi-phase structure thermoplastic resin include polymers prepared by polymerizing one or more of vinyl monomers such as vinyl aromatic monomers, for example, styrene, nucleus-substituted styrenes such as methyl styrene, dimethyl styrene, ethyl styrene, isopropyl styrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate.

Further, halogenated vinyl or vinylidene monomers (with the most prefered monomers being vinyl chloride or vinylidene chloride), vinyl naphthalene, vinyl carbazole, acrylamide, methacrylamide, maleic anhydride, phenyl maleimide, cyclohexyl maleimide, other vinyl-type monomers, and mixtures thereof may be employed.

The multi-phase structure thermoplastic resin used in the present invention is a propylene polymer matrix or a vinyl polymer matrix in which the other matrix polymer is uniformly dispersed in a spherical form.

The polymer dispersed in the matrix has a particle diameter of 0.001 to 10 μm, preferably 0.01 to 5 μm. When the particle diameter of the dispersed polymer is less than 0.001 μm or is more than 10 μm, dispersibility of the multi-phase resin is poor when blended with a propylene polymer (I), with the result that, for example, the appearance of molded articles such as bumpers made from the composition deteriorates, the impact resistance reduces, or the improvement effect of coating properties is insufficient.

The vinyl polymer in the multi-phase structure thermoplastic resin used in the present invention has a number average polymerization degree of 5 to 10,000, preferably 10 to 5,000.

When the number of average polymerization degree is less than 5, the improvement effect of coating properties of molded articles is insufficient, and inversely, when it is in excess of 10,000, melt viscosity becomes unpreferably high, moldability deteriorates, and surface luster of molded articles falls off.

The multi-phase structure thermoplastic resin used in the present invention comprises 5 to 95% by weight, preferably 20 to 90% by weight, of a propylene polymer. Therefore, the content of a vinyl polymer is 95 to 5% by weight, with from 80 to 10% by weight being preferred. When the content of the propylene polymer is less than 5% by weight, compatibility of the multi-phase resin with the propylene polymer (I) is insufficient, and inversely, when it is in excess of 95% by weight, the improvement effect of coating and adhering properties of molded articles such as car bumpers are insufficient.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, 100 parts by weight of a propylene polymer is suspended in water. Separately, in 5 to 400 parts by weight of at least one vinyl monomer were dissolved 0.1 to 10 parts by weight, based on 100 parts by weight of the vinyl monomer, of one or a mixture of radical polymerizable organic peroxides represented by the under-mentioned general formula (a) or (b) and 0.01 to 5 parts by weight, based on 100 parts by weight of the total of the vinyl monomer and the radical polymerizable organic peroxide, of a radical polymerization initiator in which a decomposition temperature of said initiator to obtain a half-life period of 10 hours is from 40° to 90° C., and the resulting solution is then added to the aqueous resin suspension. The mixture is then heated under conditions that the decomposition of the radical polymerization initiator does not occur substantially, in order to impregnate the propylene polymer with the vinyl monomer, the radical polymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the propylene polymer, thereby obtaining a graft polymerization precursor (A).

It is not essential to melt and knead the graft polymerization precursor (A) before blending it with the propylene polymer, that is, the thus obtained graft polymerization precursor (A) may be directly melted and mixed with a propylene polymer (I).

Furthermore, the multi-phase thermoplastic resin (II) of the present invention can be obtained by kneading the graft polymerization precursor (A) under melting at 100° to 300° C.

Alternatively, the propylene polymer (I) may be mixed with the graft polymerization precursor (A), and the mixture may be then kneaded under melting to obtain the multi-phase structure thermoplastic resin (II).

The most preferred multi-phase structure thermoplastic resin (II) can be prepared by kneading the graft polymerization precursor (A).

The above-mentioned radical polymerizable organic peroxides are compounds represented by the general formulae (a) or (b):

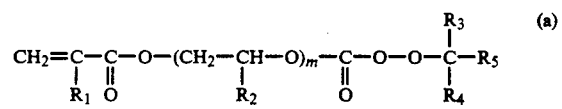

wherein $R_1$ is a hydrogen atom or an alkyl group having 1 or 2 carbon atoms, $R_2$ is a hydrogen atom or a methyl group, each of $R_3$, $R_4$ is an alkyl group having 1 to 4 carbon atoms, and R is an alkyl group having 1 to 12 carbon atoms, a phenyl group, an alkyl-substituted phenyl group or a cycloalkyl group having 3 to 12 carbon atoms, m is 1 or 2

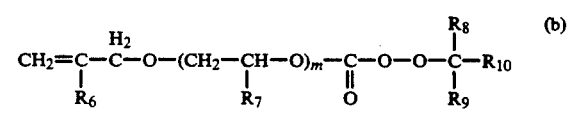

wherein $R_6$ is a hydrogen atom or an alkyl group having 1 to 4 carbon atoms, $R_7$ is a hydrogen atom or a methyl group, each of $R_8$, $R_9$ is an alkyl group having 1 to 4 carbon atoms, and each of $R_5$, $R_{10}$ is an alkyl group having 1 to 12 carbon atoms, a phenyl group, an alkyl-substituted phenyl group or a cycloalkyl group having 3 to 12 carbon atoms, n is 0, 1 or 2.

Typical examples of the radical polymerizable organic peroxides represented by the general formula (a) include
t-butylperoxyacryloyloxyethyl carbonate,
t-amylperoxyacryloyloxyethyl carbonate,
t-hexylperoxyacryloyloxyethylcarbonate,
1,1,3,3-tetramethylbutylperoxyacryloyloxyethyl carbonate,
cumylperoxyacryloyloxyethyl carbonate,
p-isopropylperoxyacryloyloxyethyl carbonate,
t-butylperoxymethacryloyloxyethyl carbonate,
t-amylperoxymethacryloyloxyethyl carbonate,
t-hexylperoxymethacryloyloxyethyl carbonate,
1,1,3,3-tetramethylbutylperoxymethacryloyloxyethyl carbonate, cumylperoxymethacryloyloxyethyl carbonate,
t-isopropylcumylperoxymethacryloyloxyethyl carbonate,
t-butylperoxyacryloyloxyethyl carbonate,
t-amylperoxyacryloyloxyethoxyethyl carbonate,
t-hexylperoxyacryloyloxyethoxyethyl carbonate,
1,1,3,3-tetramethylbutylperoxyacryloyloxyethoxyethyl carbonate, cumyperoxyacryloyloxyethoxyethyl carbonate,
p-isopropylperoxyacryloyloxyethoxyethyl carbonate,
t-butylperoxymethacryloyloxyethoxyethyl carbonate,
t-amylperoxymethacryloyloxyethoxyethyl carbonate,
t-hexylperoxymethacryloyloxyethoxyethyl carbonate,
1,1,3,3-tetramethylbutylperoxymethacryloyloxyethoxyethyl carbonate, cumylperoxymethacryloyloxyethoxyethyl carbonate,
p-isopropylperoxymethacryloyloxyethoxyethyl carbonate,
t-butylperoxyacryloyloxyisopropyl carbonate,
t-amylperoxyacryloyloxyisopropyl carbonate,
t-hexylperoxyacryloyloxyisopropyl carbonate,
1,1,3,3-tetramethylbutylperoxyacryloyloxyisopropyl carbonate, cumylperoxyacryloyloxyisopropyl carbonate,
p-isopropylperoxyacryloyloxyisopropyl carbonate,
t-butylperoxymethacryloyloxyisopropyl carbonate,
t-amylperoxymethacryloyloxyisopropyl carbonate,
t-hexyperoxymethacryloyloxyisopropyl carbonate,
1,1,3,3-tetramethylbutylperoxymethacryloyloxyisopropyl carbonate, cumylperoxymethacryloyloxyisopropyl carbonate,
p-isopropylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-amylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, a thermoplastic elastomer (III) may be blended in addition with the resins (I)+(II). Examples of the thermoplastic elastomer include diene rubbers such as polybutadiene, styrene-butadiene copolymer, acrylonitrile-butadiene copolymer, polyisoprene; nondiene rubbers such as ethylene-α-olefin-polyene copolymer; styrene-butadiene block copolymer, hydrogenated styrene-butadiene block copolymer, ethylene-propylene elastomer, styrene-grafted ethylene-propylene elastomer, ethylene-type ionomer resin, hydrogenated styrene-isoprene block copolymer, and mixtures thereof.

Of these elastomers, preferred ones are ethylene-propylene copolymer rubber and ethylene-propylene-diene copolymer rubber, because of the features in terms of impact resistance, gasoline resistance and appearance of molded articles therefrom. The most preferable elastomers are those having a Mooney viscosity (ML$_{1+4}$, 100° C.) of from 10 to 150.

In the present invention, an inorganic filler (IV) may be blended in addition with the components (I)+(II) or (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite, and mixtures thereof.

Of these fillers, preferable ones are calcium carbonate, barium sulphate, talc. The most preferable one is talc because of the features when blended thereto in terms of mechanical properties, apperance and heat stability of molded articles. Although conventional talc may be employed, those having an average particle diameter of from about 1 to about 4 μm are preferred. When the content of the filler is in excess of 100 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The theromoplastic composition of the present invention may be manufactured by melting and mixing the above-mentioned components comprising essentially (I)+(II) at a temperature of 150° to 300° C.

When the temperature is less than 150° C., melting is insufficient, and the melt viscosity becomes unpreferably high, resulting in a separation or delamination of layers in molded articles, and inversely, when it is in excess of 300° C., decomposition or gelation of resins to be blended occurs.

In melting and mixing, there may be employed a conventional kneader such as a mixing roll mill, a Banbury'mixer, a kneader mixer, a kneading extruder, a biaxial extruder and mixing rolls.

In the present invention, various additives may be used, in so far as they do not deviate from the gist of the present invention.

Examples of such usable additives include an inorganic flame retardant such as magnesium hydroxide or aluminum hydroxide, a usual halogen or phosphorus-series organic flame retardant, an organic or inorganic filler such as metal powder, talc, glass fiber, carbon fiber, wood powder and the like; an antioxidant, an ultraviolet inhibitor, a lubricant, a disperant, a coupling agent, a foaming agent, a crosslinking agent, a colorant; another thermoplastic resins such as polyolefin resin; an engineering plastics such as aromatic polyester resin, polyphenylene ether resin, polyamide resin, polycarbonate resin, polyoxymethylene resin, or polyphenylene sulfide resin; a vinyl polymer such as polystyrene, ABS, MBS, polyvinyl chloride, and the like.

Now, the present invention will be described in detail in reference to examples.

REFERENTIAL EXAMPLE 1

Preparation of Multi-phase Structure Thermoplastic Resin IIA

In a 5-liter stainless steel autoclave was placed 2,500 g of pure water, and 2.5 g of polyvinyl alcohol was dissolved therein as a suspending agent. In the solution was placed 700 g of propylene polymer (which was denoted by PP in tables) (trade name NISSEKI POLY-PRO J 650 G; made by Nippon Petrochemicals Co., Ltd.), followed by stirring to suspend the polymer therein. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butyl-peroxymethacryloyloxyethyl carbonate as a radical polymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the propylene polymer was impregnated with the vinyl monomer containing the radical polymerization initiator and the radical polymerizable organic peroxide.

After it had been confirmed that the total amount of the impregnated vinyl monomer, radical polymerizable organic peroxide and radical polymerization initiator was 50% by weight or more of the original total weight thereof, the temperature of the mixture was raised up to a level of 80° to 85° C., and this temperature was maintained for 7 hours to complete polymerization, followed by water washing and drying, thereby obtaining a graft polymerization precursor (A). The polystyrene was extracted from this graft polymerization precursor (A) with ethyl acetate, and according to measurement by the use of GPC, the number average polymerization degree of the polystyrene in said precursor (A) was 900.

Next, this graft polymerization precursor (A) was extruded at 200° C. by a plastomill monoaxial extruder (Tokyo Seiki Seisaku-sho Ltd.) to perform graft reaction, thereby obtaining a multi-phase structure thermoplastic resin IIA. This multi-phase structure thermoplastic resin IIA was then observed by a scanning-type electron microscope (trade name JEOL JSM T300; made by JEOL, Ltd.), and it was found that it was a multi-phase structure thermoplastic resin in which spherical polymer particles having a diameter of 0.3 to 0.5 μm were uniformly dispersed. In this case, the grafting efficiency of the polystyrene was 55% by weight.

REFERENTIAL EXAMPLE 2

Preparation of Multi-phase Structure Thermoplastic Resin IIB

The same procedure as in Referential Example 1 was repeated with the exception that 300 g of styrene as a vinyl monomer was replaced with a mixed monomer consisting of 210 g of styrene monomer and 90 g of acrylonitrile, and 1.5 g of benzoyl peroxide was replaced with 3 g of di-3,5,5-trimethyl-hexanoylperoxide (trade name Perloyl 355; made by Nippon Oils & Fats Co., Ltd.), and 0.3 g of α-methylstyrene dimer (trade name NOFMER MSD; made by Nippon Oils & Fats Co., Ltd.) as a molecular weight modifier was used, thereby preparing a multi-phase structure thermo-plastic resin IIB. The average polymerization degree of the styrene-acrylonitrile copolymer was 1,200, and the average diameter of the polymer particles dispersed in this resin composition was from 0.3 to 0.5 μm.

EXAMPLES 1 TO 7

Propylene polymer (trade name NISSEKI POLY-PRO J650G; made by Nippon Petrochemicals Co., Ltd.), and the multi-phase structure thermoplastic resin obtained in Reference Examples were melted and blended together in ratios in Table 1.

In melting and mixing the materials, they were first dry blended with one another and were then fed to a one-direction rotating diaxial extruder having a screw diameter of 30 mm wherein a temperature of the screw was set to 230° C. Afterward, the mixture was extruded and then formed into grains.

Next, specimens are prepared therefrom by an injection molding machine. Sizes of the specimens were as follows:

Specimens for notched izod impact strength . . . 13 mm×65 mm×6 mm

Specimens for heat distortion temperature . . . 13 mm×130 mm×6 mm

Test procedures are as follows.
(1) Notched izod impact strength: . . . JIS K7110
(2) Heat distortion temperature: . . . JIS K7207
(3) Adhering properties:

After spray application of acrylic paints to test panels, the painted test panels were then scribed on one face thereof with 11 vertical scribe lines at 1 mm intervals passing through the organic coatings to the base substrate, thereby scribing a lattice having 100 squares with a 1 mm side each. An adhesive tape (made by Nichiban Co., Ltd.) was stuck and was then suddenly removed therefrom and the number of remaining squares unpeeled is reported.

(4) Gasoline resistance:

After spray application of acrylic paints to test panels followed by immersion of the panels in a regular gasoline, the panels are tested for adhering properties.

(5) Appearance:

After molding trial bumpers fitted with 4 ribs on each reverse side of said bumpers, the external appearance of the said bumpers are visually inspected to make a thorough examination for the presence of flow marks.

Trial bumpers: 460 mm×120 mm×56 mm, 3 mm thickness

EXAMPLES 8 TO 12

In Examples 8 to 10, a glass fiber having an average diameter of 10 μm with an average length of 5.0 mm was additionally blended with the compositions of Examples 2, 4 and 5 respectively. In Example 11 to 12, the multi-phase structure thermoplastic resin IIA of the compositions of Examples 2 and 4 was replaced with the graft polymerization precursor (A) prepared in Reference Examples. The results are set forth in Table 2.

EXAMPLES 13 TO 17

Propylene polymer and the multi-phase structure thermoplastic resin IIA used in Examples 1 were blended with an ethylene-propylene copolymer (which was denoted by EPR in tables) (trade name EP-02P; made by Nippon Synthetic Rubber Co., Ltd.) or an ethylene-propylene diene copolymer (which was denoted by EPDM in tables) (trade name EP 21; made by Nippon Synthetic Rubber Co., Ltd.) as a thermoplastic elastomer (III). The results are set forth in Table 3.

EXAMPLES 18 TO 22

The resin compositions in Examples 13 to 17 were blended respectively with a talc as an inorganic filler (IV). The results are set forth in Table 4.

COMPARATIVE EXAMPLES 1 TO 8

The same procedure as in above-mentioned Examples was repeated with the exception that the multi-phase structure thermoplastic resins were replaced with a polystyrene (which was denoted by PS in tables) (trade name DIAREX HF 55; made by Mitsubishi Monsanto-Kasei Co., Ltd.), or an acrylonitrile-styrene copolymer (trade name Denka AS AS-S-312; made by Denki Kagaku Kogyo Co., Ltd.). The results are shown in Table 5.

TABLE 1

| Example No. | 1 | 2 | 3 | 4 | 5 | 6 | 7 |
|---|---|---|---|---|---|---|---|
| Propylene Polymer (% by wt.) | 90 | 80 | 70 | 50 | 20 | 70 | 50 |
| Multi-phase Structure Thermoplastic Resin IIA (% by wt.) | 10 | 20 | 30 | 50 | 80 | — | — |
| Multi-phase Structure Thermoplastic Resin IIB (% by wt.) | — | — | — | — | — | 30 | 50 |
| Notched Izod Impact Strength (kg · cm/cm) | 8 | 8 | 10 | 12 | 10 | 10 | 12 |
| Heat Distortion Temperature (°C.) (18.6 kg/cm$^2$) | 113 | 115 | 109 | 110 | 108 | 113 | 112 |
| Adhering properties | 100 | 100 | 100 | 100 | 100 | 100 | 100 |

TABLE 2

| Example No. | 8 | 9 | 10 | 11 | 12 |
|---|---|---|---|---|---|
| Propylene Polymer (% by wt.) | 80 | 50 | 20 | 80 | 50 |
| Multi-phase Structure Thermoplastic Resin IIA (% by wt.) | 20 | 50 | 80 | — | — |
| Graft Polymerization Precursor (A) (% by wt.) | — | — | — | 20 | 50 |
| Glass Fiber (parts by wt.)[1] | 20 | 20 | 20 | — | — |
| Notched Izod Impact Strength (kg · cm/cm) | 12 | 15 | 15 | 10 | 9 |
| Heat Distortion Temperature (°C.) (18.6 kg/cm$^2$) | 142 | 140 | 141 | 111 | 109 |
| Adhering properties | 100 | 100 | 100 | 100 | 100 |

[1] parts by weight based on 100 parts by weight of resin (PP + IIA)

TABLE 3

| Example No. | 13 | 14 | 15 | 16 | 17 |
|---|---|---|---|---|---|
| Propylene Polymer (% by wt.) | 60 | 40 | 30 | 40 | 20 |
| Multi-phase Structure Thermoplastic Resin IIA (% by wt.) | 20 | 40 | 30 | 40 | 60 |
| EPR (% by wt.) | 20 | 20 | 40 | — | 20 |
| EPDM (% by wt.) | — | — | — | 20 | — |
| Notched Izod Impact Strength (kg · cm/cm) | | | | | |
| at room temperature | 40 | 38 | 47 | 45 | 35 |
| −40° C. | 21 | 20 | 25 | 25 | 19 |
| Heat Distortion Temperature (°C.) (18.6 kg/cm$^2$) | 111 | 109 | 105 | 105 | 108 |
| Adhering properties | 100 | 100 | 100 | 100 | 100 |
| Gasoline Resistance | 100 | 100 | 100 | 100 | 100 |
| Appearance (existence of flow mark) | no | no | no | no | no |

TABLE 4

| Example No. | 18 | 19 | 20 | 21 | 22 |
|---|---|---|---|---|---|
| Propylene Polymer (% by wt.) | 60 | 40 | 30 | 40 | 20 |
| Multi-phase Structure Thermoplastic Resin IIA (% by wt.) | 20 | 40 | 30 | 40 | 60 |
| EPR (% by wt.) | 20 | 20 | 40 | 20 | 20 |
| Talc[1] (parts by wt.)[2] | 20 | 20 | 20 | 40 | 20 |
| Notched Izod Impact Strength (kg · cm/cm) | | | | | |
| at room temperature | 45 | 42 | 47 | 48 | 39 |
| −40° C. | 22 | 21 | 25 | 25 | 19 |
| Heat Distortion Temperature (°C.) (18.6 kg/cm$^2$) | 133 | 137 | 130 | 140 | 130 |
| Adhering properties | 100 | 100 | 100 | 100 | 100 |
| Gasoline Resistance | 100 | 100 | 100 | 100 | 100 |
| Appearance (existence of flow mark) | no | no | no | no | no |

[1] trade name LMS-200; made by Fuji Talc Kogyo Co. Ltd.
[2] parts by weight based on 100 parts by weight of resin (PP + IIA + EPR)

TABLE 5

| Comparative Example No. | 1 | 2 | 3 | 4 | 5 | 6 | 7 | 8 |
|---|---|---|---|---|---|---|---|---|
| Propylene Polymer (% by wt.) | 0 | 100 | 90 | 80 | 80 | 80 | 60 | 60 |
| Polystyrene (% by wt.) | 100 | 0 | 10 | 20 | — | — | — | 20 |
| Acrylonitrile/styrene Copolymer (% by wt.) | — | — | — | — | 20 | — | 20 | — |
| EPR (% by wt.) | — | — | — | — | — | 20 | 20 | 20 |
| Talc[1] (parts by wt.) | — | — | — | — | — | 20 | — | 20 |
| Notched Izod Impact Strength (kg · cm/cm) | 2 | 7 | 3 | 2 | 3 | 18 | 6 | 8 |
| Heat Distortion Temperature | 93 | 113 | 82 | 76 | 78 | 121 | 80 | 111 |

TABLE 5-continued

| Comparative Example No. | 1 | 2 | 3 | 4 | 5 | 6 | 7 | 8 |
|---|---|---|---|---|---|---|---|---|
| (°C.) (18.6 kg/cm²) | | | | | | | | |
| Adhering properties | 100 | 0 | 60 | 80 | 90 | 40 | 80 | 70 |
| Appearance (existence of flow mark) | no | no | yes | yes | yes | yes | yes | yes |

1)parts by weight based on 100 parts by weight of resin (PP + PS + EPR)

As described in the above-mentioned examples, the thermoplastic resin composition of the present invention, which has been prepared by blending a propylene polymer (I) with a specific multi-phase structure thermoplastic resin (II) can provide various articles such as car bumpers which are excellent in impact strength, heat stability, coating properties and moldability, while in the compositions of Comparative Examples the compatibility is insufficient and the impact strength of molded articles lowers.

What is claimed is:

1. A molded car bumper made from a thermoplastic resin composition comprising:
   (I) 1 to 99 parts by weight of a propylene polymer other than resin II, and
   (II) 99 to 1 parts by weight of a multi-phase structure thermoplastic resin which is a graft copolymer comprising 5 to 95% by weight of a propylene polymer and 95 to 5% by weight of a vinyl polymer or copolymer obtained from at least one vinyl monomer selected from the group consisting of vinyl aromatic monomers, acrylonitrile and methacrylonitrle monomers, and vinyl ester monomers, one of the components being in the form of a dispersed phase having a particle diameter of 0.001 to 10 μm, said graft copolymer being obtained by melting and kneading a graft polymerization precursor (A) which is prepared by copolymerizing at least one vinyl monomer with at least one radical polymerizable organic peroxides having the formulae (a) or (b)

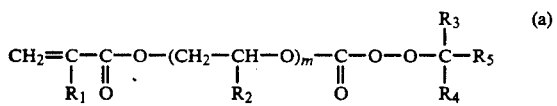

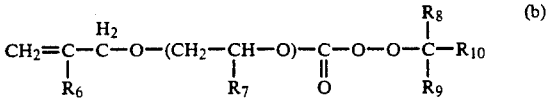

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of a propylene polymer, and
   (III) an amount of 1 to 100 parts by weight based on 100 parts by weight of (I)+(II) of an ethylene-α-olefin copolymer rubber, and
   (IV) an inorganic filler in an amount of from 1 to 100 parts by weight based on 100 parts by weight of (I)+(II).

2. A molded car bumper as claimed in claim 1 wherein said ethylene-α-olefin copolymer rubber is a ethylenepropylene copolymer having a Mooney viscosity ($ML_{1:4}$, 100° C.) of from 10 to 150.

3. A bumper as claimed in claim 1 wherein said inorganic filler is a talc having an average particle size of from 1 to 4 μm.

4. A molded car bumper as claimed in claim 1 wherein the particle diameter of the dispersed phase in the multi-phase structure thermoplastic resin is from 0.01 to 5 μm.

5. A molded car bumper as claimed in claim 1 in which the vinyl polymer or copolymer in the multi-phase structure thermoplastic resin has a number average polymerization degree of 10 to 5,000.

6. A molded car bumper as claimed in claim 1 wherein the weight ratio of the propylene polymer to the vinyl polymer or copolymer in the multi-phase structure thermoplastic resin is 90/10 to 20/80.

7. A molded car bumper as claimed in claim 6 in which the vinyl polymer or copolymer in the multi-phase structure thermoplastic resin has a number average polymerization degree of 10 to 5,000.

8. A molded car bumper as claimed in claim 7 wherein the particle diameter of the dispersed phase in the multi-phase structure thermoplastic resin is from 0.01 to 5 μm.

* * * * *

UNITED STATES PATENT AND TRADEMARK OFFICE
CERTIFICATE OF CORRECTION

PATENT NO. : 5,166,240

DATED : November 24, 1992

INVENTOR(S) : Suehiro Sakazume et al.

It is certified that error appears in the above-identified patent and that said Letters Patent is hereby corrected as shown below:

Abstract, line 8, for "weigth" read --weight--.

Column 6, line 45, for "apperance" read --appearance--.

Column 7, line 12, for "disperant" read --dispersant--.

Signed and Sealed this

Twenty-fifth Day of January, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,166,240
DATED : Nov. 24, 1992
INVENTOR(S) : Suehiro Sakazume et al It is certified that error appears in the above-indentified patent and that said Letters Patent is hereby corrected as shown below:

On title page, item [73], should read as follows:
--Nippon Petrochemicals Co., Ltd., Japan and Nippon Oil & Fats Co., Ltd., Japan--

Signed and Sealed this

Twelfth Day of April, 1994

Attest:

BRUCE LEHMAN

Attesting Officer

Commissioner of Patents and Trademarks